United States Patent
Mashimo (10) Patent No.: US 7,411,879 B2
(45) Date of Patent: Aug. 12, 2008

(54) OPTICAL DISK DEVICE

(75) Inventor: Akira Mashimo, Tokorozawa (JP)

(73) Assignee: TEAC Corporation, Tama-shi (JP)

( * ) Notice: Subject to any disclaimer, the term of this patent is extended or adjusted under 35 U.S.C. 154(b) by 612 days.

(21) Appl. No.: 11/177,137

(22) Filed: Jul. 8, 2005

(65) Prior Publication Data
US 2006/0007822 A1    Jan. 12, 2006

(30) Foreign Application Priority Data
Jul. 12, 2004    (JP)    ............... 2004-205147

(51) Int. Cl.
*G11B 7/00*    (2006.01)
(52) U.S. Cl. ............... 369/47.27; 369/44.13
(58) Field of Classification Search ............ 369/275.3, 369/44.26, 47.1, 47.27, 44.13
See application file for complete search history.

(56) References Cited

U.S. PATENT DOCUMENTS

| | | | |
|---|---|---|---|
| 5,623,459 | A | 4/1997 | Iwamura |
| 5,745,502 | A | 4/1998 | Khayrallah et al. |
| 6,061,823 | A | 5/2000 | Nara |
| 6,097,695 | A | 8/2000 | Kobayashi |
| 6,418,093 | B2 * | 7/2002 | Maeda et al. ............ 369/44.13 |
| 6,765,972 | B1 | 7/2004 | Kawasaki |

FOREIGN PATENT DOCUMENTS

| | | |
|---|---|---|
| EP | 0 798 889 A | 10/1997 |
| JP | 7-169205 A | 7/1995 |
| JP | 2000-200468 A | 7/2000 |
| JP | 2001-45083 A | 2/2001 |

OTHER PUBLICATIONS

"Next Generation DVD Specification HD DVD," *Nikkei Electronics/Nikkei BP*, Oct. 13, 2003, pp. 126-134 with partial English translation.

"Essentials of Next Generation Optical Disk," Excerpt from Nikkei Electronics Books, Nikkei Business Publications, Inc., Tokyo, Oct. 7, 2003, pp. 106-108.

Notice of Grounds for Rejection (JP) dated May 20, 2008, issued in corresponding Japanese Application No. 2005-147036.

* cited by examiner

*Primary Examiner*—Nabil Z Hindi
(74) *Attorney, Agent, or Firm*—Christensen O'Connor Johnson Kindness PLLC (57) ABSTRACT

An optical disk device which drives an HD-DVD or the like. When recording or reproducing data with respect to an optical disk of HD-DVD, the address information is demodulated by an address decoding circuit and is supplied to a system controller. The system controller performs error checking using the CRC technique. When a resulting CRC value does not correspond to CRC bits, the system controller regards a bit in which the number of waves in wobbles having the same phase is not four, which is a predetermined value, as an error bit, and performs bit data replacement with respect to the error bit. Specifically, the system controller searches for a combination of bit values by which a resulting CRC value matches the CRC bits, thereby performing error correction. At this time, the system controller tries the data value replacement preferentially using a combination of bit values by which the address is advanced by one address from the immediately previous address which is fixed among all the possible combinations with respect to the error bits.

9 Claims, 7 Drawing Sheets

OPTICAL DISK DEVICE

BACKGROUND OF THE INVENTION

1. Field of the Invention

The present invention relates to an optical disk device, and more particularly to a high-definition optical disk device which uses grooves for data recording and reproducing.

2. Description of Related Art

HD (High-Definition) DVDs have been proposed in recent years as next generation DVDs. It is intended that the HD-DVDs adopt the disk structure of the current DVDs so as to ensure compatibility therewith, while simultaneously achieving higher density data recording than that of the previous generation DVDs.

As one main feature, HD-DVDs adopt the land/groove recording method in which information is recorded in both lands and grooves. Land tracks and groove tracks are formed in wobbles, in which address information is embedded. More specifically, address information is expressed using phase modulation in such a manner that four waves having a phase of 0 degrees represent "0" and four waves having a phase of 180 degrees represent "1". Here, a plurality of, in this case, four, waves with the same phase are provided in order to increase the accuracy of address information detection by means of redundancy. For the address information to be embedded in the form of wobbles, binary data are converted into a gray code in which the distance between codes (inter-code distance) for adjacent sets of binary data, that is, the number of inverted bits, is equal to 1. Accordingly, in gray code, address "0" is represented as "00000000"; address "1" is represented as "00000001"; address "2" is repented as "00000011"; address "3" is represented as "00000010"; address "4" is represented as "00000110", and so on.

On the other hand, it is also possible that the address information is embedded by forming grooves in wobbles and data is recorded or reproduced with respect to only grooves. In this case, as it is not necessary to provide the address information to lands, the need for converting the address information into gray code before being embedded is eliminated. It is also possible to add check bits for CRC (Cyclic Redundancy Check) or CRC bits to the address information of the grooves. When data is recorded only in grooves, the address information is also expressed using phase modulation in such a manner that four waves having a phase of 0 degrees represent "0" and four waves having a phase of 180 degrees represent "1", in the same manner as in the land/groove recording. Here, four waves having identical phases are used to express one bit data both in an optical disk in which data is recorded in grooves and lands and in an optical disk in which data is recorded in grooves only, in order to allow both types of optical disks to be driven by a single optical disk device. As such, it is possible to enable a single disk device to drive both "HD DVD-R" (write-once or Recordable) which is an optical disk in which data is recorded in grooves only and "HD DVD-RW" (Rewritable) which is an optical disk in which data is recorded in grooves and lands. Such HD-DVDs are generally described in the Oct. 13, 2003 issue of "Nikkei Electronics" (Nikkei BP, Oct. 13, 2003, pp. 126-134).

As described above, the address information is expressed by means of phase modulation in such a manner that four waves having a phase of 0 degrees represent a bit value "0" and four waves having a phase of 180 degrees represent a bit value of "1", and the bit value of "0" or "1" can be determined basically according to the principle of majority rule. More specifically, when three waves having a phase of 0 degrees and only one wave having a phase of 180 degrees are detected for one bit, the bit value can be determined to be "0".

However, even when three waves having a phase of 0 degrees are detected, there is no guaranteeing that the bit data is truly "0". It is therefore desirable to further increase the detection accuracy. Further, when two waves having a phase of 0 degrees and two waves having a phase of 180 degrees are detected, i.e. when a half of the four waves represent 0 and the other half of the four waves represent 1, it is not possible to determine which of the data 0 or 1 is represented by such wobbles.

Of course, a reading error bit can be determined by performing CRC using CRC bits. With the CRC technique, however, even when 9-bit check bits are added, for example, it is only possible to detect an error in three or less bits. Accordingly, with the CRC technique, it is not possible to correct an error and determine a correct address.

SUMMARY OF THE INVENTION

The present invention provides an optical disk device with an increased accuracy of detecting (or demodulating) address information in an optical disk in which the address information is embedded using phase modulation in such a manner that four waves having identical phases represent bit data "0" or "1".

In accordance with one aspect of the present invention, there is provided an optical disk device for recording or reproducing data with respect to grooves of an optical disk in which address information is embedded by forming the grooves in wobbles, in which the wobbles of N waves with the same phase form data of a single bit, and a predetermined check bit for CRC is added to the address information, the optical disk device comprising address determining means for determining a bit in which the number of waves with the same phase in the wobbles is N/2 to be a reading error bit and replacing bit data of the reading error bit such that a resulting CRC value matches the check bit for CRC, when a resulting CRC value with regard to the address information which is obtained by reproducing the wobbles does not match the check bit for CRC.

In accordance with another aspect of the present invention, there is provided an optical disk device for recording or reproducing data with respect to grooves of an optical disk in which address information is embedded by forming the grooves in wobbles, in which the wobbles form data of a single bit using N waves with the same phase, and a predetermined check bit for CRC is added to the address information, the optical disk device comprising address determining means for determining a bit in which the number of waves with the same phase in the wobbles is N−1 or smaller to be a reading error bit and replacing bit data of the reading error bit such that a resulting CRC value matches the check bit for CRC, when a resulting CRC value with regard to the address information which is obtained by reproducing the wobbles does not match the check bit for CRC.

In accordance with a further aspect of the present invention, there is provided an optical disk device for recording or reproducing data with respect to grooves of an optical disk in which address information is embedded by forming the grooves in wobbles, in which the wobbles form data of a single bit using N waves with the same phase, and a predetermined check bit for CRC is added to the address information, the optical disk device comprising address determining means for determining a bit in which the number of waves with the same phase in the wobbles is N/2 to be a reading error bit and replacing bit data of the reading error bit such that a resulting CRC value matches the check bit for CRC when a resulting CRC value with regard to the address information which is obtained by reproducing the wobbles does not match the check bit for CRC, and for further determining a bit in which the number of waves with the same phase in the wobbles is N−1 or smaller to be a reading error bit and replacing bit data of the reading error bit such that a resulting CRC value matches the check bit for CRC when the resulting CRC value with regard to the address information which is obtained does not match the check bit for CRC even by the bit data replacement which is performed.

According to the present invention, when the resulting CRC value does not match the CRC bits, attention is focused on the number of waves, for one bit, having the same phase. When the number of such waves equals a predetermined value N, the bit data for that bit is determined to be correct. On the other hand, when the number of such waves does not equal the predetermined value and the number is N/2 or N−1, it is assumed that the resulting CRC value is incorrect because an error has been caused in this bit, and such a bit is regarded as an error bit and error correction is performed by performing bit data replacement with regard to this error bit.

BRIEF DESCRIPTION OF THE DRAWINGS

A preferred embodiment of the present invention will be described in detail based on the following drawings, wherein.

DETAILED DESCRIPTION OF PREFERRED EMBODIMENT

A preferred embodiment of the present invention will be described in detail with reference to the accompanying drawings.

Figure 1:
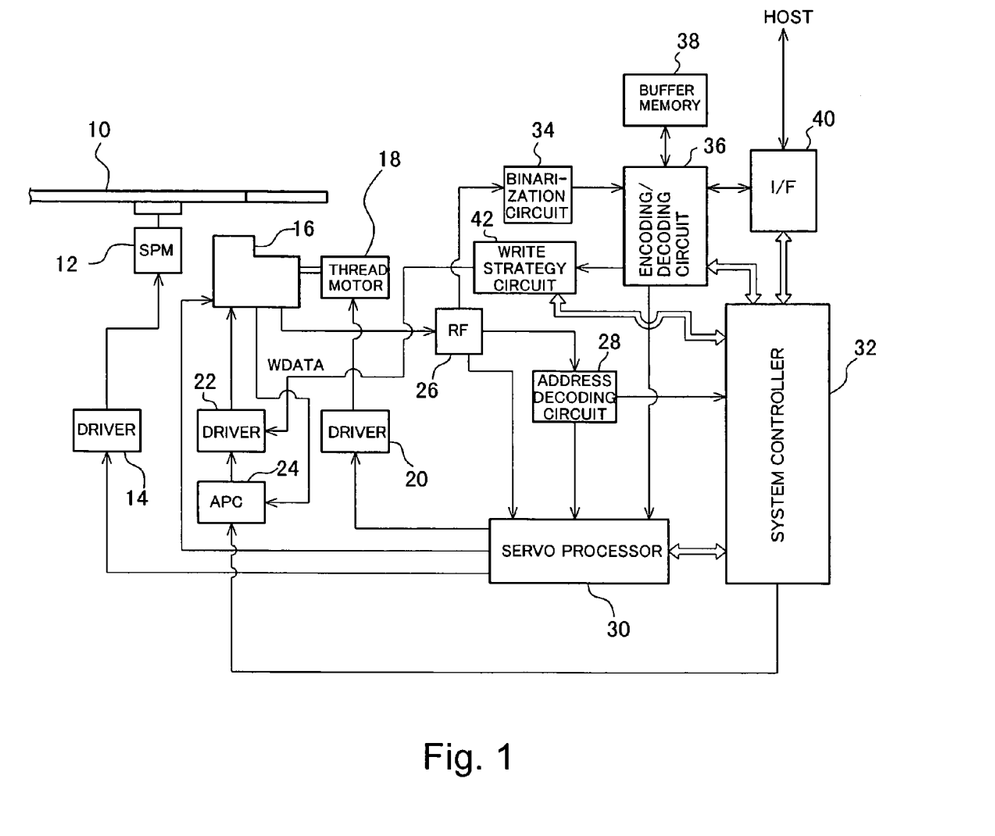
FIG. 1 is a diagram showing the overall structure of an optical disk device according to one embodiment of the present invention.

FIG. 1 shows the overall structure of an optical disk device according to the present embodiment. An optical disk 10 is rotated by a spindle motor (SPM) 12. The spindle motor SPM 12 is in turn driven by a driver 14, which, in turn, is servo-controlled by a servo processor 30 so as to operate at a desired rotation rate. In the example used to illustrate the present embodiment, the driver 14 divides the optical disk 10 into a plurality of zones from the inner radius to the outer radius, and drives the spindle motor SPM so as to achieve a constant angular velocity in each zone (ZCAV). Here, an HD DVD-R is one example of the optical disk 10.

An optical pickup 16, which includes a laser diode (LD) for irradiating laser light onto the optical disk 10 and a photodetector (PD) for receiving and converting light reflected from the optical disk 10 into an electric signal, is disposed opposite the optical disk 10. The optical pickup 16 is driven by a thread motor 18 in the radial direction of the optical disk 10. The thread motor 18 is driven by a driver 20, which is servo-controlled by the servo processor 30 in the same manner as the driver 14. Further, the LD of the optical pick-up 16 is driven by the driver 22, which is controlled by an auto power control circuit (APC) 24 such that a drive current assumes a desired value. Specifically, the APC 24 controls the drive current of the driver 22 such that it becomes the optimum recording power selected by OPC (Optimum Power Control) which is performed in a test area (PCA) of the optical disk 10. The OPC is a process in which test data is recorded on the PCA of the optical disk 10 while changing the recording power stepwise, and then the test data is reproduced for evaluation of the signal quality, so that the recording power with which the desirable signal quality can be obtained is selected. As an index of signal quality, a β value and a Y value, a degree of modulation, jitter, or the like is used.

When reproducing the data recorded on the optical disk 10, laser light of reproduction power is emitted from the LD of the optical pickup 16, and the light reflected on the disk is converted into an electrical signal by the PD and output. A reproduction signal from the optical pickup 16 is supplied to an RF circuit 26, which generates a focus error signal and a tracking error signal from the reproduction signal and supplies these signals to the servo processor 30. The servo processor 30 servo controls the optical pickup 16 based on these error signals and retains the optical pickup 16 in the on-focus and on-track conditions.

The optical pickup 16 performs recording and reproduction with respect to grooves of the optical disk 10. The grooves are formed helically on the optical disk 10. Further, the RF circuit 26 supplies an address signal contained in the reproduction signal to an address decoding circuit 28. The address decoding circuit 28 demodulates the address signal to obtain address data of the optical disk 10, and supplies the demodulation data to the servo processor 30 and a system controller 32. The address data is embedded in the grooves of the optical disk 10 in the form of wobbles. The optical disk 10 includes a segment address and a track address as the address data. The address data is previously subjected to phase modulation such that four waves having a phase of 0 degrees represent a bit value "0" and four waves having a phase of 180 degrees represent a bit value "1". These four waves having the same phase constitute a redundant system.

The RF circuit 26 supplies a reproduction RF signal to a binarization circuit 34. The binarization circuit 34 binarizes (digitizes as binary data) the reproduced signal and supplies the resulting signal to an encode/decode circuit 36. The binary signal is then subjected to demodulation and error correction in the encode/decode circuit 36 to obtain reproduction data, which is output to a host device, such as a personal computer, via an interface I/F 40. Here, the encode/decode circuit 36 temporarily stores the reproduction data in a buffer memory 38 before outputting the reproduction data to the host device.

For recording data onto the optical disk 10, data to be recorded is supplied from the host device to the encode/decode circuit 36 via the interface I/F 40. The encode/decode circuit 36 stores the data to be recorded in the buffer memory 38, and then encodes and supplies the data to be recorded, as modulation data (ETM (Eight to Twelve Modulation) data), to a write strategy circuit 42. The write strategy circuit 42 converts the modulation data into multi-pulses (a pulse train) in accordance with a predetermined recording strategy, and supplies the multi-pulses, as recording data, to the driver 22. The recording strategy is constituted by pulse widths of a leading pulse or subsequent pulses in multi-pulses and the pulse duty, for example. The recording strategy, which affects recording quality, is generally fixed to a certain optimum strategy, and may be set during optimum power control (OPC). Then, the laser light whose power was modulated according to the recording data is emitted from the LD of the optical pickup 16 onto the optical disk 10 for recording the data. After the data is recorded as described above, the optical pickup 16 emits laser light of reproducing power so as to reproduce the recorded data, and outputs the reproduced data to the RF circuit 26. The RF circuit 26 supplies the reproduction signal to the binarization circuit 34 where the data is binarized and supplied to the encode/decode circuit 36. The encode/decode circuit 36 decodes the modulation data and verifies the thus-decoded data against the recording data stored in the buffer memory 38. The result of verification is supplied to the system controller 32, which determines, in accordance with the verification result, whether to continue data recording or perform alternation operation.

With the structure as described above, when, in order to record or reproduce data with respect to the grooves, a groove track is traced and the address information is detected by the address decoding circuit 28 and supplied to the system controller 32, four consecutive waves with the same phase can be detected for one bit when the data is read correctly, and the bit value represented by these waves can be determined to be "0" or "1" in accordance with the detected phase. However, when only three or two waves with the same phase are detected, there is a possibility that a reading error has occurred. Here, when only three waves with the same phase are detected, although the bit value can be determined in accordance with the detected phase based on the principle of majority rule, the reliability of the information is relatively low. Further, when only two waves with the same phase are detected, it is not even possible to determine the bit value based on the principle of majority rule. In either case, the bit value is forcedly read as either 0 or 1, and determination is made as to whether or not a resulting CRC value corresponds to the check bit for CRC (CRC bit). If correspondence is not found, it is then determined that the address information which was read is erroneous. In the CRC technique, which is a known error detection technology, data to be checked is treated as binary data and is processed using a computing expression called a generating polynomial for generating check bits composed of a determined number of bits. Then, the check bits for CRC are added to the data to be checked. On the demodulation side, data to be checked is reproduced and processed using the generating polynomial, and determination is made as to whether or not the resulting CRC value thus processed and the CRC bits match, whereby presence of an error is determined. Here, a parity bit is a 1-bit CRC bit, by which a single-bit error can be detected. While three or less bit errors can be detected by CRC bits composed of nine bits, these errors cannot be corrected because it is indeterminate which bits are error bits. In particular, when the address information is 12-bit data, it is not practical to search all the possible combinations of the twelve bits in order to detect errors.

Accordingly, in the present embodiment, when the resulting CRC value does not match the CRC bits with regard to the address information which is read and occurrence of a reading error is determined, which bit position in the address information the error has occurred is then detected, to thereby enable correction of the error. The bit position where an error has occurred is specified based on the determination whether or not the number of waves having the same phase is four. More specifically, it is determined that data is read correctly when the number of waves with the same phase is four, whereas when the number of waves with the same phase is not four, it is determined that an error has occurred at the bit position.

Figure 2:
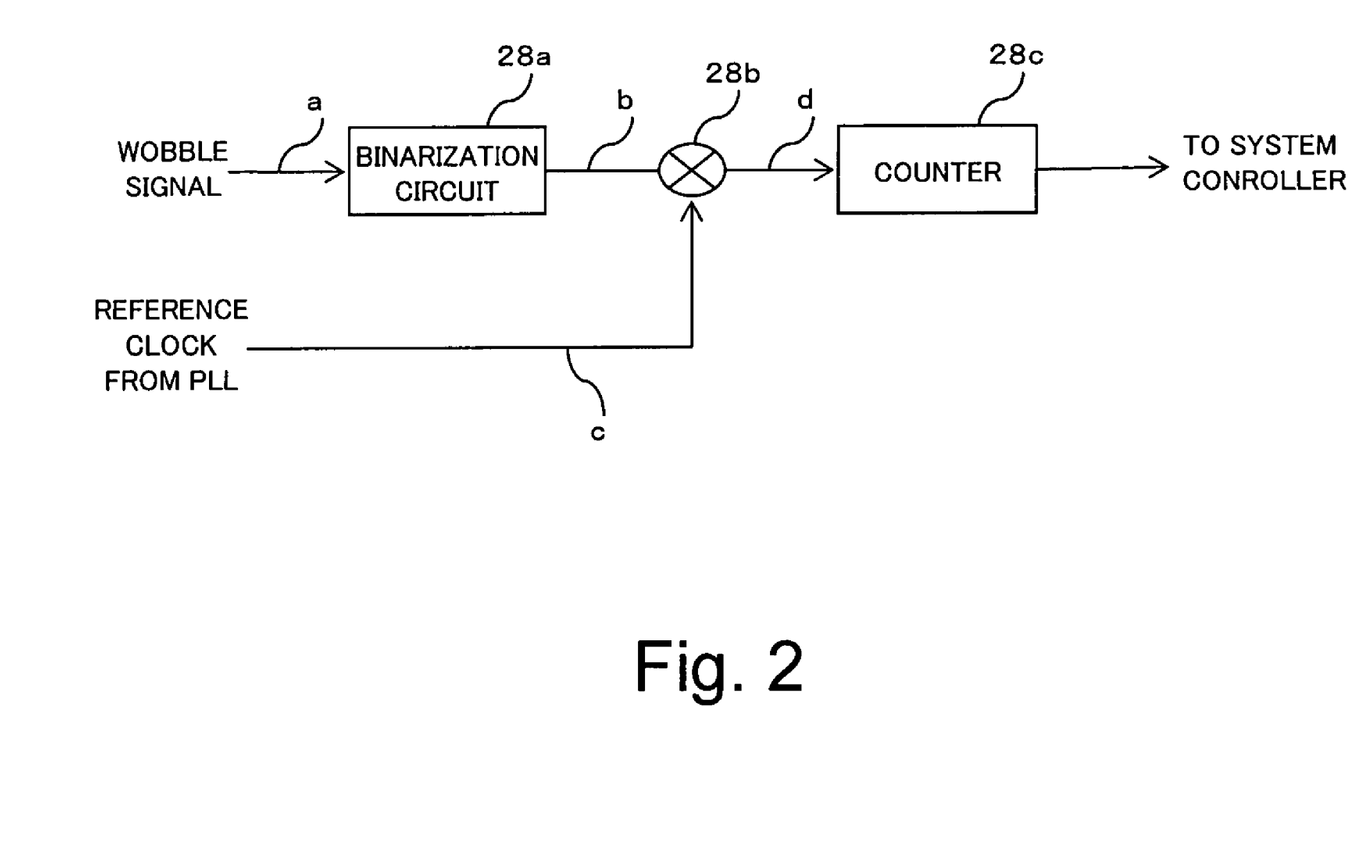
FIG. 2 is a diagram showing a structure of an address decoding circuit according to the embodiment of the present invention.

FIG. 2 shows a counting circuit for counting the number of waves with the same phase for one bit, in the address decoding circuit 28. FIGS. 3A to 3D show a timing chart with respect to each part shown in FIG. 2. The counting circuit includes a binarizer 28*a* for binarizing a wobble signal extracted from an RF signal, an Exclusive-OR (EOR) gate 28*b*, and a counter 28*c*.

Figure 3A:
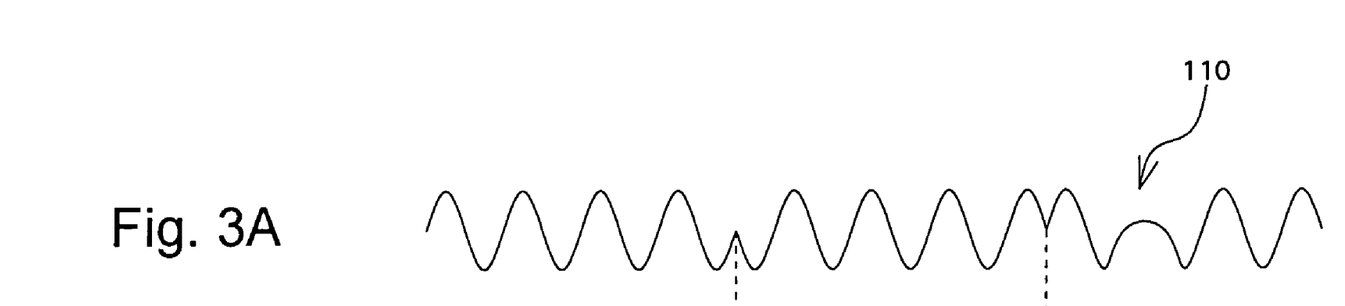
FIGS. 3A to 3D are timing charts of a wobble signal.
Figure 3B:
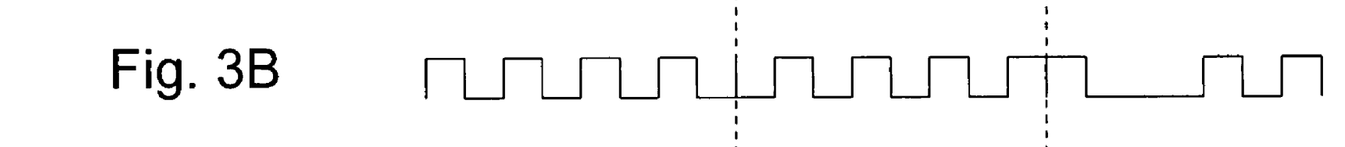
Figures 3C, 3D:
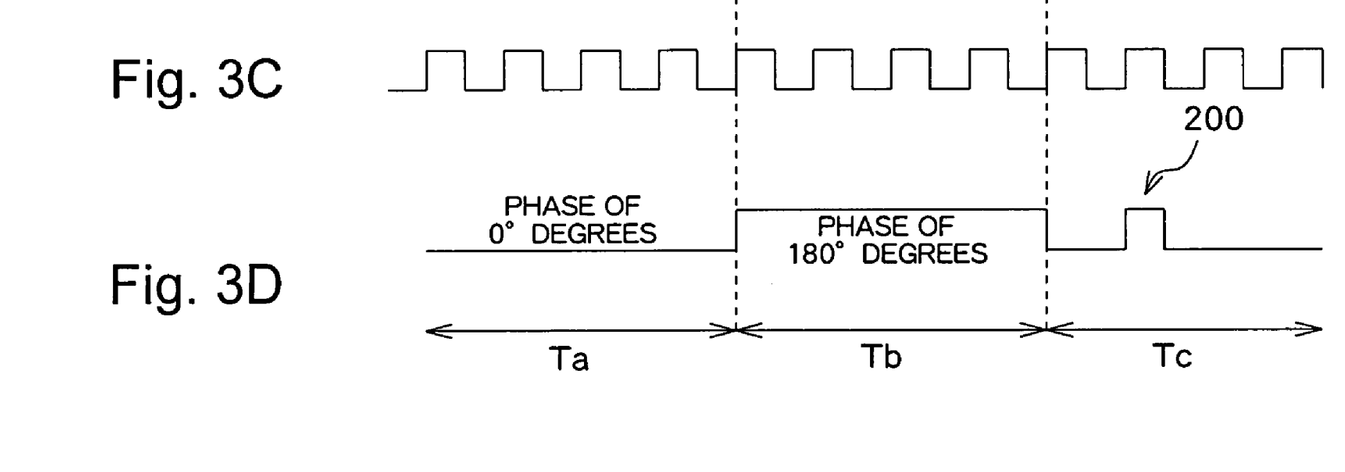

The binarizer 28*a* binarizes a wobble signal which is input and outputs a binarized signal. FIG. 3A shows an input wobble signal, and FIG. 3B shows a binarized wobble signal, which is to be supplied to the EOR gate 28*b*. On the other hand, a reference clock signal from a PLL circuit (not shown) is also supplied to the EOR gate 28*b*. FIG. 3C shows a reference clock signal.

The EOR gate 28 performs an Exclusive-OR operation with respect to the binarized wobble signal and the reference clock signal, and outputs the resulting signal to the counter 28*c*. FIG. 3D shows the resulting output signal. When both the binarized wobble signal and the reference clock signal are at H or L level, the output signal is at L level. When one of the binarized wobble signal and the reference clock signal is at H level and the other is at L level, the output signal is at H level. Accordingly, when wobbles are read correctly during the period Ta (corresponding to one bit data length of the address information), the binarized wobble signal includes four pulses at H level and is continuously of the identical value with the reference clock signal, thereby continuously providing an output signal at L level. Consequently, the counter 28*c* counts the number of pulses 0, determining that the number of waves with the same phase of 0 degrees is four. Further, when wobbles are also read correctly during the period Tb, the binarized wobble signal includes four pulses at L level and is continuously has a different value from the reference clock signal, thereby continuously providing an output signal at H level. Consequently, the counter 28*c* counts the number of pulses 0, namely detects that the number of waves with the same phase of 180 degrees is four. However, if an error occurs in reading wobbles so that the second wave 110 of four waves cannot be detected during the period Tc of FIG. 3, the binarized wobble signal includes only three pulses at H level and has a different value from the reference clock signal at this undetected data portion, thereby proving an output signal including one pulse 200. Consequently, the counter 28*c* counts the number of pulses 1, thereby detecting that the number of waves with the same phase of 0 degrees is three. In this manner, the number of waves with the same phase is counted for each bit and the result is supplied to the system controller 32.

Figure 4:
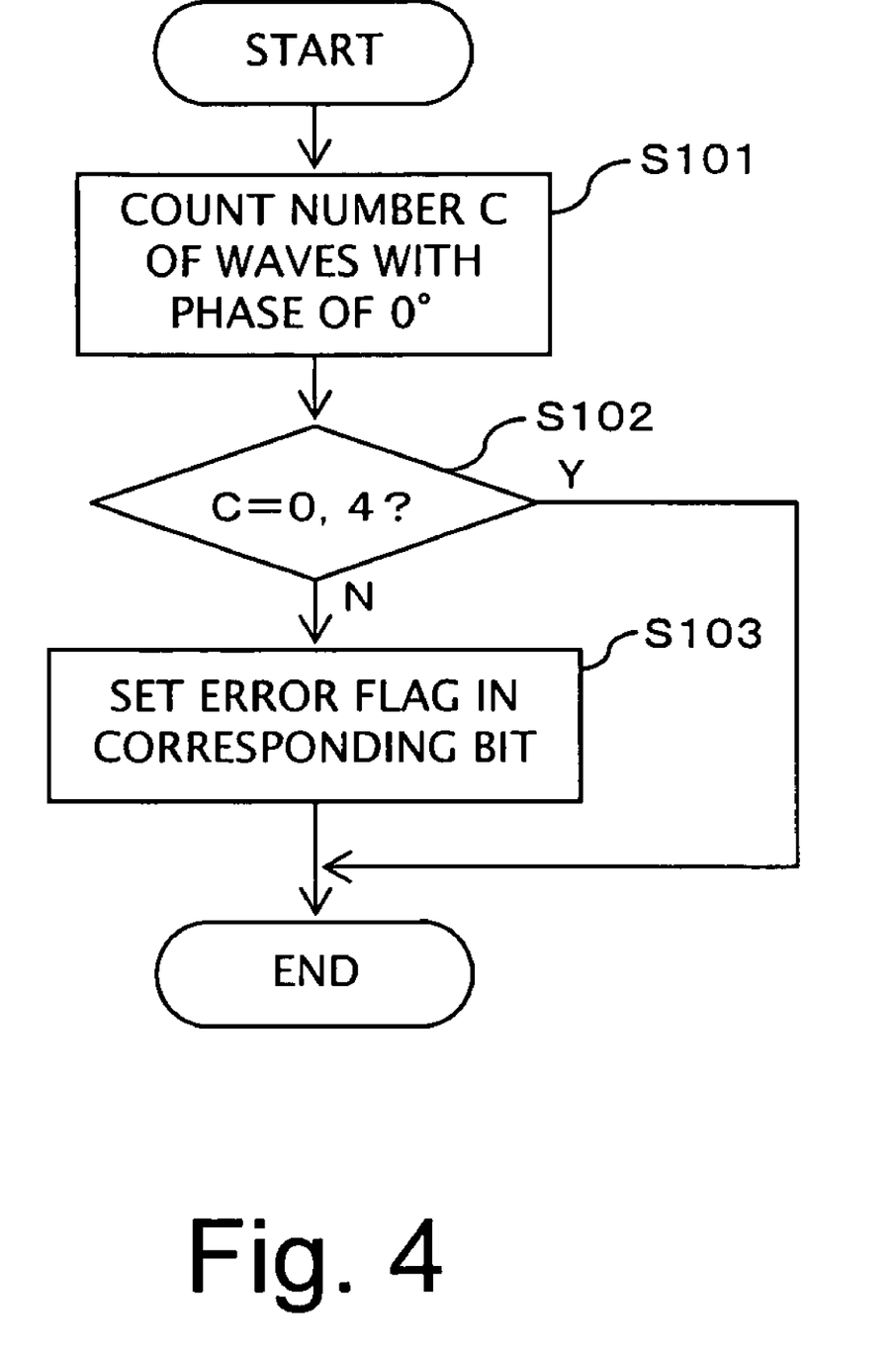
FIG. 4 is a flowchart of an error bit specifying process according to the embodiment of the present invention.

FIG. 4 shows a flowchart of an address information decoding process according to the present embodiment. First, the number C of waves having a phase of 0 degrees is counted by the counter 28*c* (S101). Then, the system controller 32 determines whether or not a relationship of C=0 or C=4 is fulfilled, namely whether or not the number of waves is zero or four (S102). If the number of waves is four, the bit value is determined to be "0". If the number of wave is zero (i.e. if the number of waves of 180 degrees is four), the bit value can be determined to be "1". In either case, it is determined that no reading error has occurred.

On the other hand, if the relationship of C=0 or C=4 is not fulfilled, i.e. if C=1, 2, or 3, in a certain bit, at step S102, the system controller 32 sets an error flag in the bit (S103). The bit in which an error flag is set is specified as an error bit which should be corrected.

Figure 5:
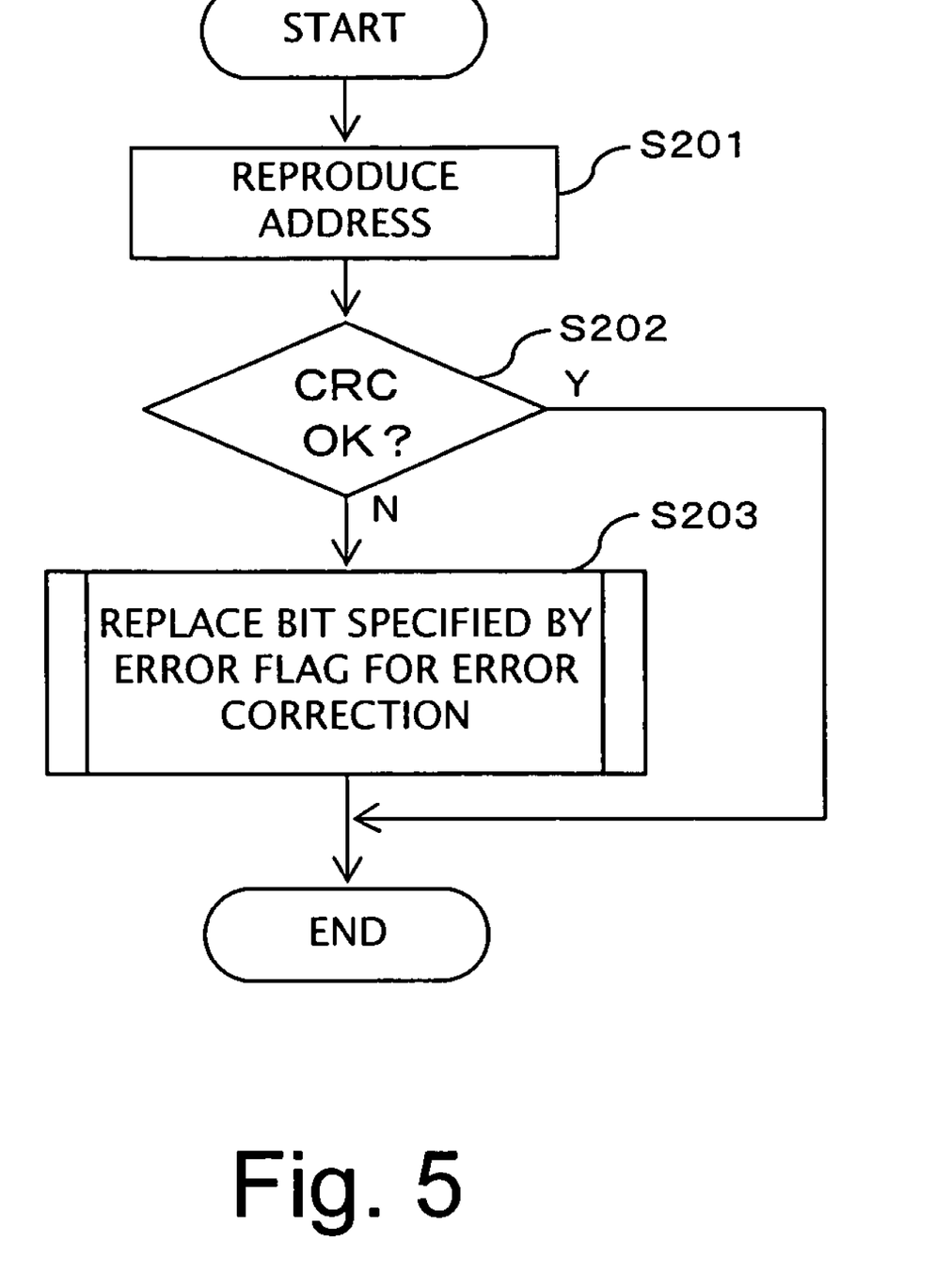
FIG. 5 is a flowchart of an error correction process according to the embodiment of the present invention.

FIG. 5 shows a flowchart of CRC performed by the system controller 32. First, the address information which is reproduced in the address decoding circuit 28 is input (S201). At this time, as the process shown in FIG. 4 is being performed in parallel, presence of absence of an error flag is also input along with the address information. For example, information that in 12-bit address information "000000000111", an error flag is set in each of the second and third order bits, or the like, is input. Then, the system controller 32 treats the input address information as binary data and processes the data using a generating polynomial to generate a CRC value. The system controller 32 then determines whether or not the CRC value thus generated matches the CRC bits which have been already added (S202). If the CRC is correct, i.e. if the resulting CRC value matches the CRC bits, it is determined that reading is performed correctly and the address is fixed. On the other hand, if the CRC is NG or incorrect, i.e. if the resulting CRC value does not correspond to the CRC bits, the system controller 32 corrects the error by performing data replacement at each bit position specified by the error flag (S203).

Figure 6:
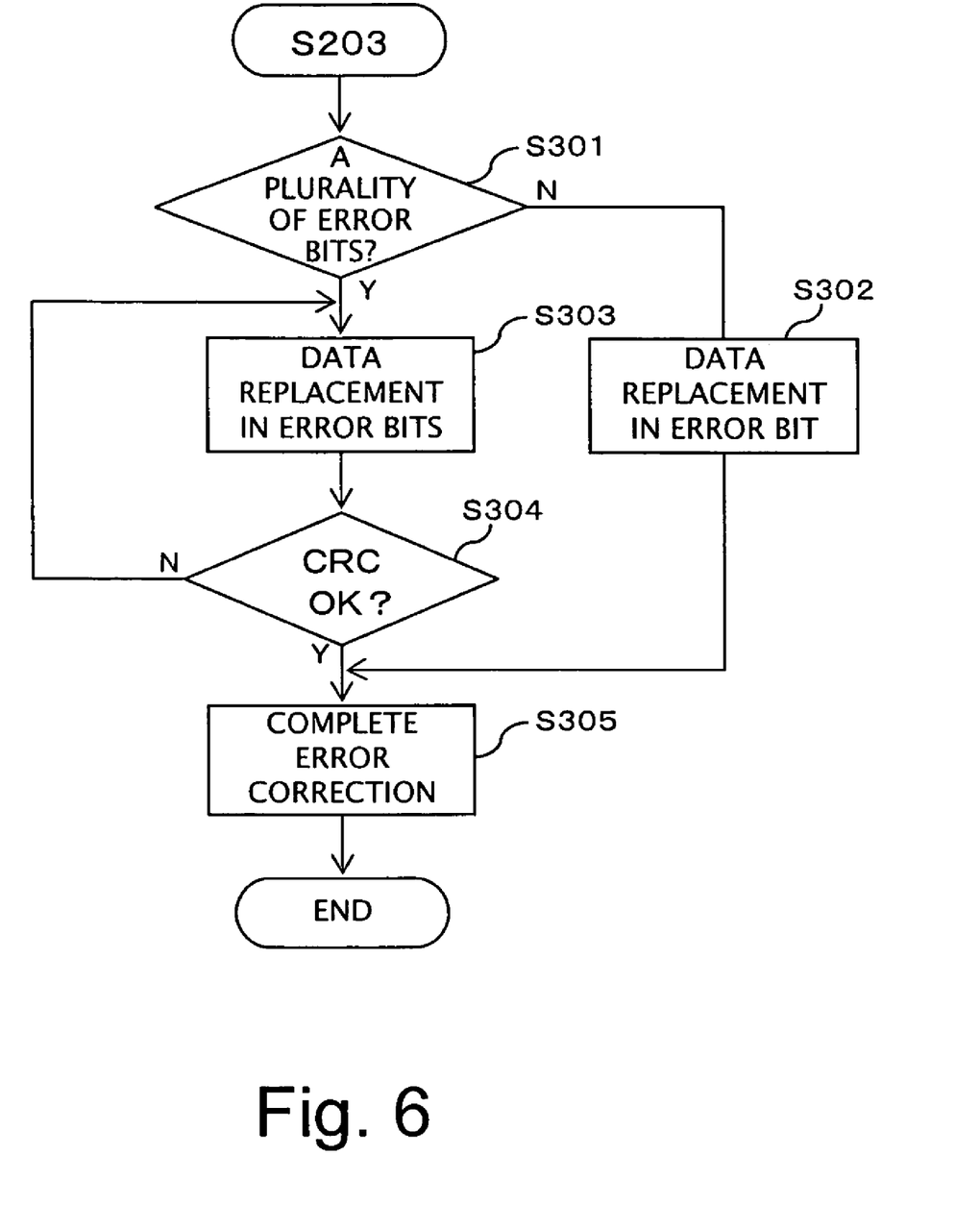
FIG. 6 is a flowchart of a detailed process of the error correction.

FIG. 6 shows a flowchart of a detailed process at step S203 of FIG. 5. First, the system controller 32 determines whether or not there are a plurality of bits (error bits) in which an error flag is set (S301). When there is only a single error bit, error correction will be completed by replacing the data value of that error bit by 0 or 1 (S302). When there are a plurality of error bits, on the other hand, data values are replaced for these error bits and then a CRC value is computed and it is determined whether or not the resulting CRC value matches the CRC. Then, if the resulting CRC does not match, the data values are replaced once again and then CRC is performed. This process is repeated until the resulting CRC value corresponds to the CRC bits (S303 and S304). Such a repeated process is performed regarding all the possible combinations of data values for the error bits. When there are two error bits, for example, the address information is processed using a generating polynomial regarding all the possible combinations of data values, i.e. (0,0), (0,1), (1,0), and (1,1) to generate a CRC value, and it is determined for each case whether or not the resulting CRC value corresponds to the CRC bits. Here, among the above combinations, with regard to the combination which is input from the address decoding circuit 28 (i.e. the current combination), the CRC is already performed and therefore need not be repeated. Accordingly, with two error bits, it is sufficient to perform the CRC regarding the remaining three combinations. Similarly, in the case of three error bits, the CRC regarding the remaining seven combinations would suffice. When data values are replaced for the error bits and the CRC is performed, a data combination regarding which the CRC is correct is determined to provide correct address information, whereby error correction is completed (S305). Here, when data values of error bits are replaced in the process at S303, the process may be performed preferentially regarding the most probable combination of data values rather than performing the process regarding all the possible combinations for the error bits. The most probable combination refers to a combination of values by which the address is advanced by one unit or one address from the immediately previous address which is already fixed, with the precondition that addresses are consecutive. Specifically, the data replacement process is performed preferentially regarding a combination by which the address is advanced by one address from the immediately previous address, among possible combinations, and the address is processed using a generating polynomial to generate a CRC value and it is determined whether or not the resulting CRC matches the CRC bits. If the CRC value matches in this process, the necessity for repeating the process regarding the remaining combinations is eliminated, thereby accelerating the error correction process. On the other hand, if the CRC value does not match the CRC bits even when the process is performed preferentially regarding the combination by which the address is advanced by one address from the immediately previous address, then, the process is performed regarding the remaining combinations.

The error correction of the address information according to the present embodiment can be summarized as follows. Specifically, CRC is performed with respect to address information using CRC bits added to the address information. If the CRC is incorrect or NG, it is considered that an error has occurred at a position of a bit in which the number of waves with the same phase is not 0 or 4, thereby specifying the position of such an error bit. Then a data value is replaced with regard to the error bit, thereby performing error correction. As such, it is possible to reliably correct an error and obtain the correct address information within the scope of error detection capability of CRC.

In the present embodiment, counting of the number C of waves with the same phase is performed simultaneously with the CRC process, and, if the resulting CRC value does not match the CRC bits, a data value is replaced with respect to a bit in which the number C of waves with the same phase is not four. However, it is also possible that, after determining that a resulting CRC does not match the CRC bits with respect to certain address information, the number of waves with the same phase is counted with regard to each bit of the address information and a data value is replaced with respect to a bit in which the number C of waves with the same phase is not four.

Further, while in the present embodiment a bit in which the number of waves with the same phase is not four is regarded as an error bit and a bit value is replaced with regard to the error bit, it is also possible to regard only a bit in which the number of waves with the same phase is two as an error bit and to perform bit data replacement with regard to such an error bit. Specifically, if the number of waves with the same phase for a certain bit in address information is one or three, a bit value of such a bit is determined based on the principle of majority rule, and such a bit is not regarded as an error bit and is processed, because such a bit has a certain degree of reliability. Further, a process algorithm in which, if there exists no combinations of bit values by which a resulting CRC value matches the CRC bits when only a bit in which the number of waves with the same phase is two is regarded as an error bit and bit data replacement is performed with respect to such an error bit, then, a bit in which the number of waves with the same phase is one or three is also regarded as an error bit and bit data replacement is performed with respect to such an error bit, may be used.

Figure 7:
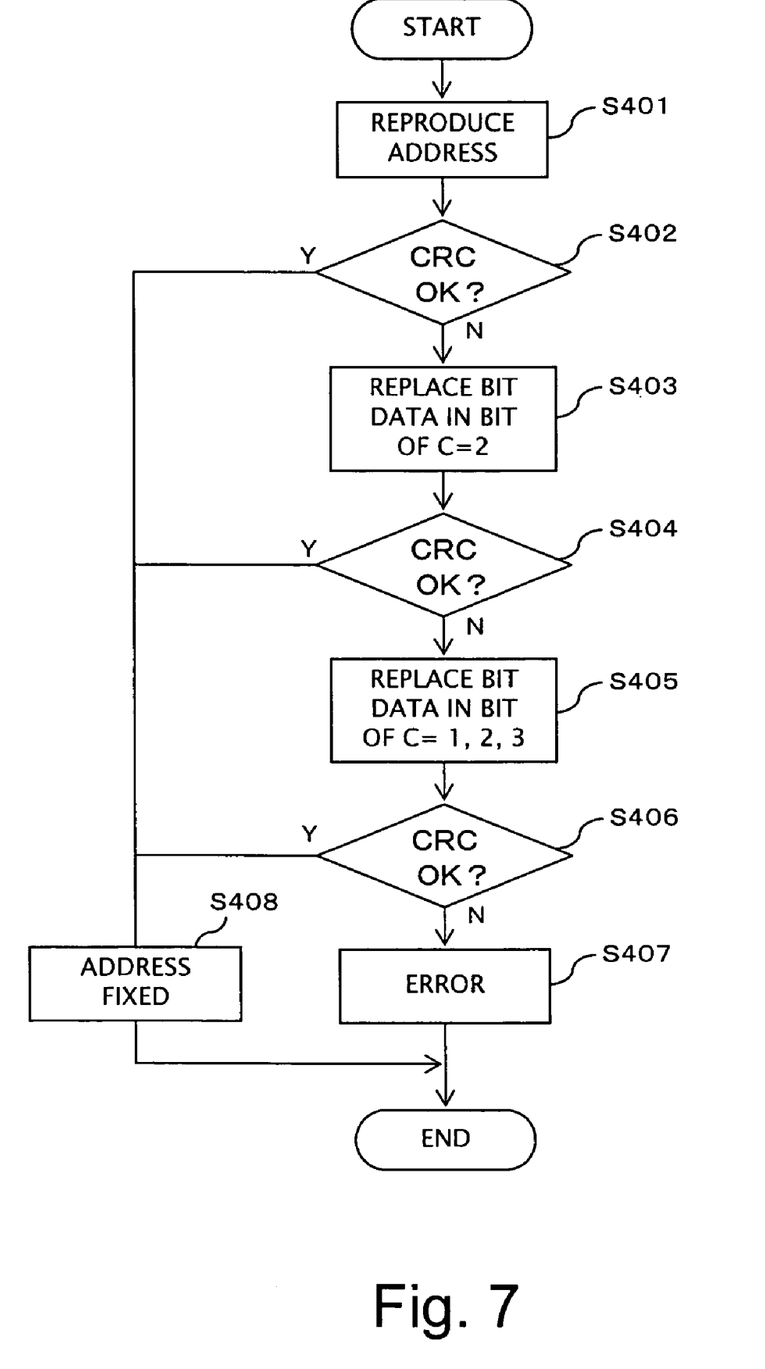
FIG. 7 is a flowchart of another process of the error correction.

FIG. 7 shows a flowchart of the above-described process. First, after address information is reproduced and input, the system controller 32 determines whether or not a CRC value of the address information (a value which is processed using a generating polynomial) match CRC bits (S402). If the CRC value does not match the CRC bits and the CRC is therefore determined to be NG, bit data replacement is then performed with respect to a bit in which the number C of waves with the same phase is two, and it is determined whether or not a CRC value with respect to address information obtained by the bit data replacement matches the CRC bits (S403 and S404). Here, when there are a plurality of bits in which the relationship of C=2 is fulfilled, bit data replacement is performed regarding all possible combinations of bit values, and whether or not a resulting CRC value corresponds to the CRC bits is determined for each combination. In such a case, bit data replacement may begin preferentially with a combination by which the address is advanced by one address from the immediately previous address, and whether or not a CRC value matches the CRC bits may be determined. When a CRC value corresponds to the CRC bits with regard to a certain combination, the address information with that combination of bit values is fixed (S408). On the other hand, when a CRC value does not correspond to the CRC bits even after all possible combinations are tried with respect to bits in which a relationship of C=2 is fulfilled, then a bit in which a relationship of C=1, 2, or 3 is fulfilled is further regarded as an error bit, and data value replacement is performed with respect to such a error bit (S405). Then, it is determined once again whether or not the resulting CRC value corresponds to the CRC bits (S406). When the CRC value corresponds to the CRC bits with respect to a certain combination, the address information with that combination is fixed (S408). Further, when the CRC value does not correspond to the CRC bits even after all the combinations are tried, an error is finally determined (S407). As described above, bit data replacement is first performed only with respect to a bit in which a relationship of C=2 is fulfilled, and then further bit data replacement is performed with respect to a bit in which a relationship of C=1, 2, or 3 is fulfilled, whereby reduction in time for error correction can be expected.

In addition, when there are four or more bits in which the number of waves having a phase of 0 degrees is two (or the number of waves with the phase of 180 degrees is two), which exceeds the detection capability of CRC, as bit information, it is determined that error correction is impossible and the address information may be determined to be NG without performing any further process.

While the preferred embodiment of the present invention has been described using specific terms, such description is for illustrative purposes only, and it is to be understood that changes and variations may be made without departing from the spirit or scope of the appended claims.

What is claimed is:

1. An optical disk device for recording or reproducing data with respect to grooves of an optical disk in which address information is embedded by forming the grooves in wobbles, in which the wobbles form data of a single bit using N waves with the same phase, and a predetermined check bit for CRC is added to the address information, the optical disk device comprising:
means for reproducing the wobbles and extracting the address information; and
address determining means for determining a bit in which the number of waves with the same phase in the wobbles is N/2 to be a reading error bit and replacing bit data of the reading error bit such that a resulting CRC value matches the check bit for CRC, when a resulting CRC value with regard to the address information which is extracted does not match the check bit for CRC.

2. An optical disk device for recording or reproducing data with respect to grooves of an optical disk in which address information is embedded by forming the grooves in wobbles, in which the wobbles form data of a single bit using N waves with the same phase, and a predetermined check bit for CRC is added to the address information, the optical disk device comprising:
means for reproducing the wobbles and extracting the address information; and
address determining means for determining a bit in which the number of waves with the same phase in the wobbles is N−1 or smaller to be a reading error bit and replacing bit data of the reading error bit such that a resulting CRC value matches the check bit for CRC, when a resulting CRC value with regard to the address information which is extracted does not match the check bit for CRC.

3. An optical disk device for recording or reproducing data with respect to grooves of an optical disk in which address information is embedded by forming the grooves in wobbles, in which the wobbles form data of a single bit using N waves with the same phase, and a predetermined check bit for CRC is added to the address information, the optical disk device comprising:
means for reproducing the wobbles and extracting the address information; and
address determining means for determining a bit in which the number of waves with the same phase in the wobbles is N/2 to be a reading error bit and replacing bit data of the reading error bit such that a resulting CRC value matches the check bit for CRC when a resulting CRC value with regard to the address information which is extracted does not match the check bit for CRC, and for further determining a bit in which the number of waves with the same phase in the wobbles is N−1 or smaller to be a reading error bit and replacing bit data of the reading error bit such that a resulting CRC value matches the check bit for CRC when the resulting CRC value with regard to the address information which is extracted does not match the check bit for CRC even by the bit data replacement which is performed.

4. An optical disk device according to claim 1, wherein when a plurality of bits are determined to be the reading error bit, the address determining means selects, among possible combinations of bit values, a combination of bit values by which a resulting CRC value matches the check bit for CRC, and performs the bit data replacement using the combination which is selected.

5. An optical disk device according to claim 2, wherein when a plurality of bits are determined to be the reading error bit, the address determining means selects, among possible combinations of bit values, a combination of bit values by which a resulting CRC value matches the check bit for CRC, and performs the bit data replacement using the combination which is selected.

6. An optical disk device according to claim 3, wherein when a plurality of bits are determined to be the reading error bit, the address determining means selects, among possible combinations of bit values, a combination of bit values by which a resulting CRC value matches the check bit for CRC, and performs the bit data replacement using the combination which is selected.

7. An optical disk device according to claim 1, wherein when a plurality of bits are determined to be the reading error bit, the address determining means selects, among possible combinations of bit values, a combination of bit values by which the address is advanced by one address from an immediately previous address which is already fixed and determines whether or not a resulting CRC value matches the check bit for CRC, and, if the resulting CRC value matches the CRC bit, the address determining means performs the bit data replacement using the combination which is selected.

8. An optical disk device according to claim 2, wherein when a plurality of bits are determined to be the reading error bit, the address determining means selects, among possible combinations of bit values, a combination of bit values by which the address is advanced by one address from an immediately previous address which is already fixed and determines whether or not a resulting CRC value matches the check bit for CRC, and, if the resulting CRC value matches the CRC bit, the address determining means performs the bit data replacement using the combination which is selected.

9. An optical disk device according to claim 3, wherein when a plurality of bits are determined to be the reading error bit, the address determining means selects, among possible combinations of bit values, a combination of bit values by which the address is advanced by one address from an immediately previous address which is already fixed and determines whether or not a resulting CRC value matches the check bit for CRC, and, if the resulting CRC value matches the CRC bit, the address determining means performs the bit data replacement using the combination which is selected.

* * * * *